United States Patent [19]

Onogi et al.

[11] Patent Number: 4,725,969

[45] Date of Patent: Feb. 16, 1988

[54] CONSTANT-SPEED DRIVING SYSTEM

[75] Inventors: Nobuyoshi Onogi, Nagoya; Akira Kuno, Oobu; Mamoru Shimamoto, Nagoya, all of Japan

[73] Assignee: Nippondenso Co., Ltd., Kariya, Japan

[21] Appl. No.: 654,663

[22] Filed: Sep. 26, 1984

[30] Foreign Application Priority Data

Sep. 28, 1983 [JP] Japan .................. 58-181412

[51] Int. Cl.$^4$ .............................. B60K 31/00
[52] U.S. Cl. .............................. 364/565; 364/431.07; 364/426; 180/179; 123/351
[58] Field of Search ........... 364/424, 565, 440, 431.07, 364/426; 324/160, 161, 162; 123/349, 350, 361, 351, 352, 360; 180/176–179

[56] References Cited

U.S. PATENT DOCUMENTS

| | | | |
|---|---|---|---|
| 3,952,829 | 4/1976 | Gray | 364/424 X |
| 4,072,206 | 2/1978 | Larson et al. | 364/426 X |
| 4,325,336 | 4/1982 | Kuno et al. | 180/170 X |
| 4,478,184 | 10/1984 | Shinoda et al. | 180/179 X |
| 4,479,184 | 10/1984 | Nakano | 123/350 X |
| 4,540,060 | 9/1985 | Kawata et al. | 180/179 |
| 4,560,024 | 12/1985 | Noda et al. | 123/352 X |
| 4,566,415 | 1/1986 | Iwai et al. | 123/361 |
| 4,577,718 | 3/1986 | Ueno | 123/361 X |
| 4,597,465 | 7/1986 | Burney | 180/179 X |
| 4,598,370 | 7/1986 | Nakajima | 364/431.07 |

FOREIGN PATENT DOCUMENTS

58-15730  1/1983  Japan .

Primary Examiner—Errol A. Krass
Assistant Examiner—Joseph L. Dixon
Attorney, Agent, or Firm—Cushman, Darby & Cushman

[57] ABSTRACT

A novel constant-speed drive system for automotive vehicles is disclosed, in which in response to an instruction for constant-speed drive while the vehicle is under acceleration, it is decided whether the vehicle acceleration at that particular time is higher than a predetermined value, and in accordance with the result of this decision, the change rate of the opening of the throttle valve is determined by use of an equation in which the value of a factor is set accordingly. In the case where the acceleration is comparatively high, the value of the factor may be changed to improve the responsiveness of the change rate of the opening of the throttle valve with the change in vehicle speed, thus making it possible to fully prevent the overshoot of the running vehicle speed.

3 Claims, 7 Drawing Figures

CONSTANT-SPEED DRIVING SYSTEM

BACKGROUND OF THE INVENTION

Field of the Invention

The present invention relates to a constant-speed driving system for vehicles such as automobiles, or more in particular to a constant-speed driving system in which an overshoot liable to occur when the vehicle experiences an acceleration more than a predetermined value when instructed to run at constant speed, that is, a phenomenon of the vehicle driving speed far exceeding a set vehicle speed, is fully dampened thereby to rapidly converge the driving speed to a set speed.

A conventional constant-speed driving system for vehicles such as automobiles comprises essential parts including an actuator for regulating the opening of a throttle valve of the engine air intake system in response to an electrical signal, a vehicle speed sensor for generating a signal associated with the vehicle speed during the driving of the vehicle, and a control circuit with a microcomputer for processing the signals at least to maintain the vehicle speed at constant level in accordance with command signals from various switches.

Assuming that a motor is used as the actuator, the control circuit operates in such a manner that in response to an instruction on constant speed drive, the speed of the vehicle at the particular time is stored as a set vehicle speed Vm, a motor drive time T is calculated at regular time intervals of 0.5 seconds, for instance, from an equation $$T = \frac{Vm - Vn - a(Vn - Vn - 1)}{K}$$

where Vm is a set vehicle speed, Vn the current running speed, and Vn−1 the running speed at time point 0.5 seconds before, that is, the preceding running speed, the motor is driven for the time T to change the opening of the throttle valve, thereby making the running speed coincide with the set vehicle speed. $a$ and K in the equation indicate factors. The motor is so driven that the valve opening increases when the motor drive time T is positive, and the valve opening decreases when the motor drive time T is negative.

In the conventional constant-speed driving system of this type, the motor drive time T is determined at the time of an instruction on constant-speed drive with the factor K as a fixed value. In the case where a constant-speed drive is ordered after acceleration of the vehicle, however, the vehicle inertia causes a great overshoot of the running speed to displace it from the set vehicle speed to a greater extent, the higher the acceleration of the vehicle at the time of the instruction on constant-speed drive.

SUMMARY OF THE INVENTION

Accordingly, the object of the present invention is to provide a constant-speed drive system obviating the above-mentioned problems, in which the acceleration of the vehicle is detected at the time point of an instruction to start the constant-speed drive, and the value of the factor K in the equation for constant-speed drive control is changed in accordance with the detected acceleration, so that the responsiveness of the actuator to the changes in vehicle speed is improved thereby to dampen such an overshoot as mentioned above.

Figure 1:
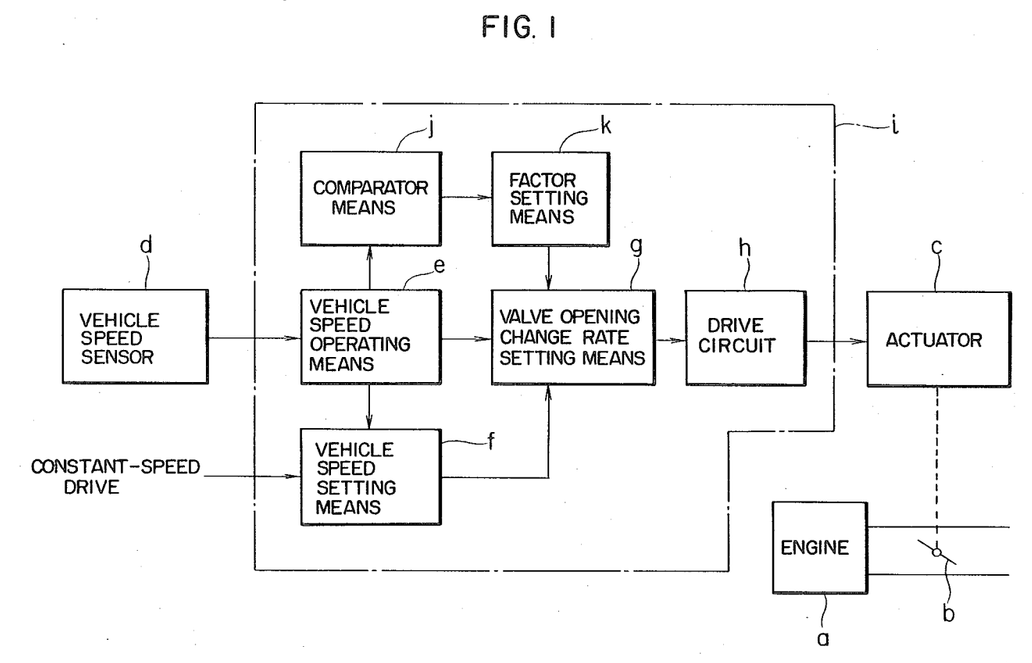
FIG. 1 is a diagram showing a basic configuration of the present invention.

According to the present invention, as shown in FIG. 1, there is provided a constant-speed drive system including apparatus and method wherein an actuator c for regulating the opening of a throttle valve b of the air intake system of an engine a in accordance with an electrical signal, a vehicle speed sensor d for generating a signal associated with vehicle speed, and a control circuit i including vehicle speed operating means e for computing the running speed of the vehicle in response to the signal from the vehicle speed sensor d, set-speed determining means f for determining, upon instruction on constant-speed drive, the running speed calculated from the vehicle speed operating means e as a set vehicle speed which is a target speed for constant-speed drive, a valve-opening change rate setting means a for determining the change rate of the opening of the throttle valve b from an equation containing at least a speed term obtained by multiplying or dividing a speed value made up of a difference between the set vehicle speed determined by the setting means f and the running speeds sequentially calculated by the vehicle speed operating means e by a factor, and a drive circuit h for driving the actuator in accordance with the change rate of the valve opening, the control circuit i further including comparator means j for comparing a vehicle acceleration corresponding to the difference between the current running speed and the previously-determined running speed with at least a predetermined value, and factor setting means k for determining the value of the factor in accordance with the result of operation of the comparator means j, wherein when the comparator means j decides that the acceleration of the vehicle ordered to run at constant speed exceeds the predetermined value, the factor setting means k changes the value of the factor to be multiplied or divided by the speed value upward or downward and the valve-opening change rate setting means g determines a change rate of the valve opening of the throttle valve b from the above-mentioned equation containing the changed factor.

DESCRIPTION OF THE PREFERRED EMBODIMENTS

An embodiment of the present invention will be explained below with reference to FIGS. 2 to 5.

Figure 2:
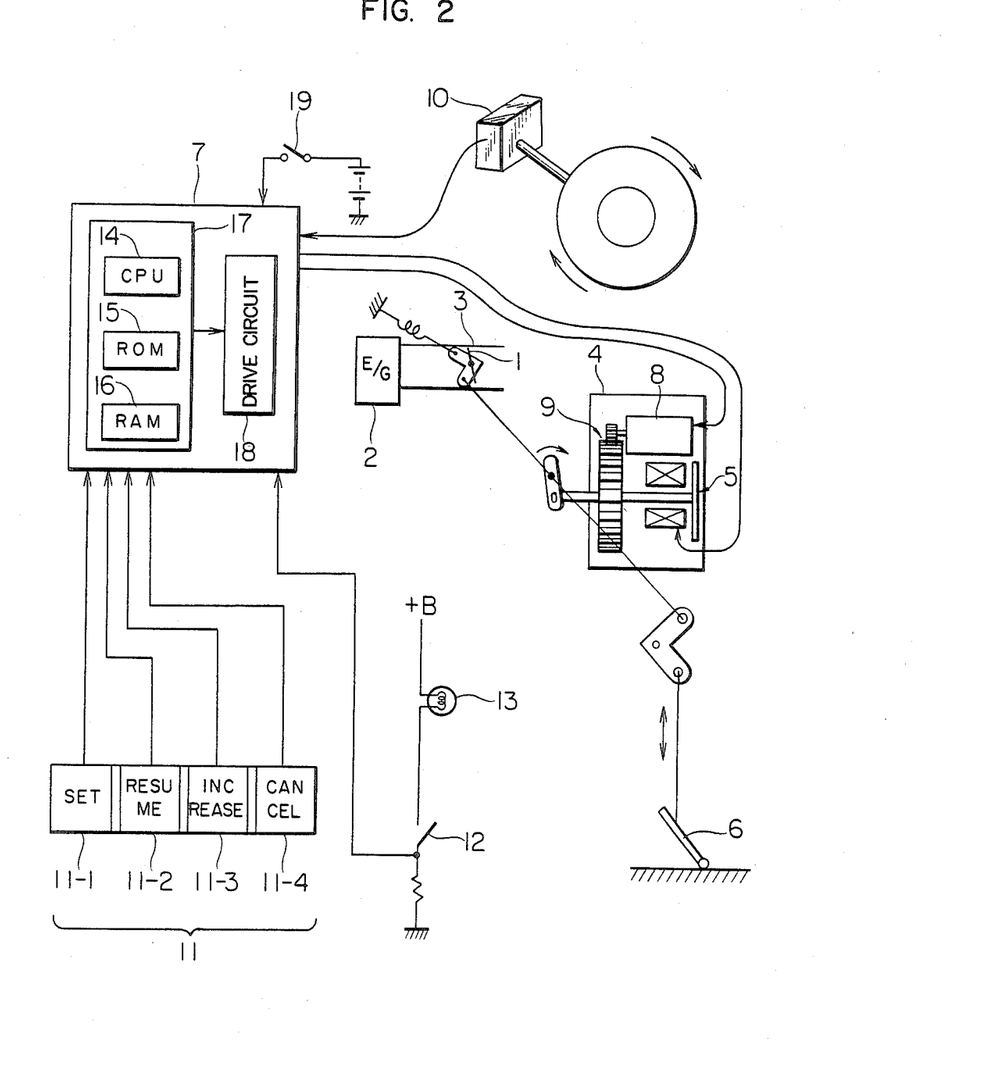
FIG. 2 is a diagram schematically showing a general configuration of an embodiment of the present invention.

FIG. 2 is a system diagram schematically showing a general configuration of an embodiment of the present invention.

In FIG. 2, reference numeral 1 designates a throttle valve arranged in an air intake pipe 3 of an engine 2.

This throttle valve 1 operates in such a way that when the output section of the motor actuator is coupled to the throttle valve 1 through a link mechanism with a magnetic clutch 5 of the motor actuator 4 kept on, the valve opening is regulated by the output of the motor actuator 4, whereas when the output section of the motor actuator is decoupled from the throttle valve 1 with the magnetic clutch 5 off, on the other hand, the valve opening is adjusted only by the degree of depression of an accelerator pedal 6.

The motor actuator 4 includes a motor 8 driven in forward or reverse direction in response to a drive signal from the control circuit 7, a reduction gear 9 for reducing the rotational speed of the motor 8, and an electromagnetic clutch 5 for transmitting or cutting off the output of the reduction gear 9 to the throttle valve 1 by other drive signals of the control circuit 7.

Numeral 10 designates a vehicle speed sensor for generating a signal corresponding to the running speed, that is, the drive speed of the vehicle, which detects the vehicle running speed by a photo coupler including a combination of a light-emitting diode and a photo-transistor and a masking plate (blade) driven by a speed meter cable. This vehicle speed sensor 10 is of the photo-electric conversion type in which the rotational speed of the speed meter cable is produced as an electrical signal caused by transmission or cut-off of light as mentioned above. Instead of this photo-electric conversion system in which the rotational speed of the vehicle wheel is produced as an electrical signal caused by transmission or cut-off of light in a manner similar to the present embodiment, a contact system in which the rotational speed of the vehicle wheel is produced as an electrical signal caused by the opening and closing of a contact, or an electromagnetic induction system in which the rotational speed of a vehicle wheel is produced as an electrical signal by use of an electromagnetic pickup, may be used with equal effect.

Numeral 11 designates a group of instruction switches for issuing various instructions to the control circuit 7, which are arranged at positions accessible by the driver. Among them, 11-1 is a set switch which is operated for ordering a constant-speed drive to apply a signal instruction the control circuit 7 to conduct a constant-speed drive or for reducing the set vehicle speed for the current constant-speed drive. Numeral 11-2 designates a resume switch for resuming a constant-speed drive at a set speed, after cancelling the constant-speed drive and adjusting the opening of the throttle valve 1 by the accelerator pedal 6. Numeral 11-3 designates an increase switch for conducting a constant-speed drive at a set speed higher than the set speed for the current constant-speed drive. Numeral 11-4 designates a cancel switch for cancelling a constant-speed drive. Numeral 12 designates a brake switch for lighting a brake lamp 13 upon depression of the brake pedal (not shown) on the one hand, and for applying an instruction signal to the control circuit 7 to forcibly cancel a constant-speed dirve when the brake pedal is depressed under constant-speed drive on the other hand.

The control circuit 7 includes a microcomputer 17 having a CPU 14, a ROM 15 and a RAM 16, and a drive circuit 18 for power-amplifying the control signal from the microcomputer 17. When a main switch 19 is on, a source voltage is applied to the control circuit 7 for processing and operation in response to various instruction signals from the switches 11 and the brake switch 12. Main processes performed by the control circuit 7 will be explained briefly. When the set switch 11-1 is turned on with the running vehicle speed within a predetermined range, the running vehicle speed at the time of returning of the set switch 11-1 from on to off state is stored as a set vehicle speed in RAM 16, while at the same time producing a drive signal for reversing or maintaining the on-state of the electromagnetic clutch 5 thereby to transmit the output of the reduction gear 9 to the throttle valve 1. Subsequently, the change rate of the opening of the throttle valve 1 is determined in such a manner that the running vehicle speed calculated from the signal of the vehicle speed sensor 10 coincides with the set vehicle speed, and a drive signal corresponding to the change rate thus determined is applied to the motor 8. The control circuit 7 also performs such an operation that if the increase switch 11-3 is operated for the purpose of increasing the set vehicle speed while under the constant-speed drive control, the opening of the throttle valve 1 increases during the period when the increase switch 11-3 remains on.

Figure 3:
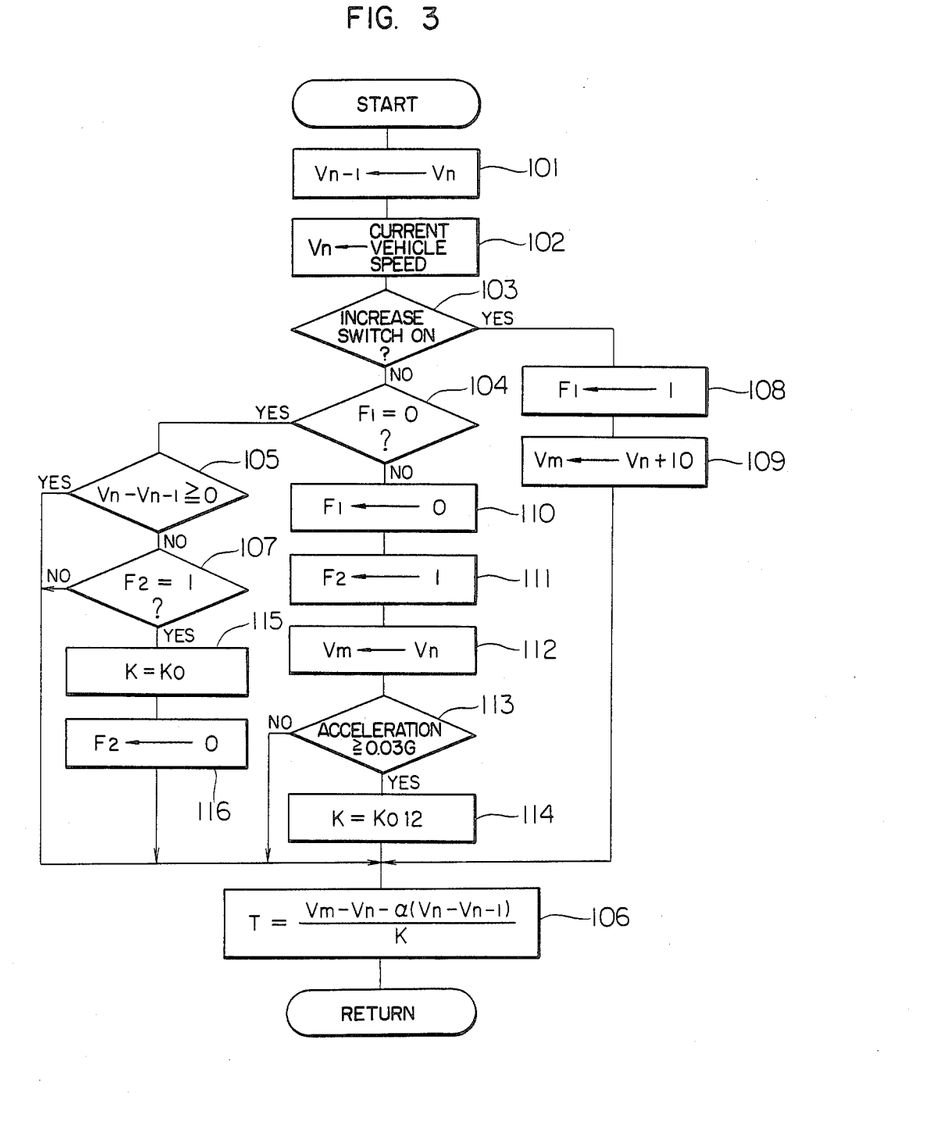
FIG. 3 is a flowchart showing the essential parts of the process performed in the control circuit.

FIG. 3 shows a flowchart representing the processes performed in the CPU 14 according to the present invention. This flowchart represents at least the processes executed repetitively during the period when the set switch 11-1 is turned on and the constant-speed drive control is conducted.

In this process, first, the running vehicle speed Vn calculated 0.5 seconds before, for example, is set in a register at step 101, and then the latest running vehicle speed, that is, the current vehicle speed Vn calculated by the vehicle speed operating means is set in another register. At step 103, it is decided whether or not the increase switch 11-3 is turned on. If the set switch 11-1 is already turned on and the constant-speed drive control is under execution but the increase switch 11-3 is not yet turned on, then step 104 decides whether or not the first flag $F_1$ is "0". In view of the fact that the first flag $F_1$ is maintained at "0" before execution of the process shown in FIG. 3 and is adapted to be set to "1" only after the increase switch 11-3 is turned on as mentioned later and that the increase switch 11-3 is not yet turned on at the time under consideration, the process is passed to step 105, where it is decided whether the current vehicle speed Vn is equal to or exceeds the preceding vehicle speed Vn−1. In other words, step 105 decides whether or not the vehicle is running at constant speed or being accelerated. If the vehicle is running at constant speed or being accelerated, the step 106 calculates the first equation:

$$T = \frac{Vm - Vn - \alpha(Vn - Vn - 1)}{K}$$

where Vm is a set vehicle speed, Vn a current vehicle speed, Vn−1 the preceding vehicle speed and $\alpha$ and K factors, thereby determining the drive time of the motor 8 corresponding to the change rate of the opening of the throttle valve 1. The set vehicle speed Vm is a running vehicle speed stored when the set switch 11-1 turned on transfers from on to off state, which process is executed by a program not shown. The motor drive time T determined as mentioned above is set in a down counter at regular intervals of time of, say, 0.5 seconds, and the drive circuit 18 is kept on until the content of the down counter is reduced to "0", so that the current power-amplified by the drive circuit 18 is applied to the motor 8. If the drive time T is positive, the motor 8 is driven in a forward direction, while if the time T is negative, the motor 8 is driven in a reverse direction. In the case where step 105 decides that the vehicle is under deceleration, on the other hand, step 107 decides whether or not the second flag $F_2$ is "1". In view of the fact that the second flag $F_2$ is kept "0" before execution of the process shown in FIG. 3 and is set to "1" only after the flag $F_1$ is set as mentioned later and that the flat $F_1$ is not yet set at the time under consideration, the process proceeds to the next step 106, where the motor drive time T is computed as when the vehicle is running at constant speed or under acceleration.

As seen from above, in the case where the set switch 11-1 is turned on and a constant-speed drive is ordered, the motor drive time T is calculated from the first equation mentioned above at regular intervals of time, say, 0.5 seconds, so that the opening of the throttle valve 1 is regulated to make the current vehicle speed Vn coincide with the set vehicle speed Vm. In the first equation above, (Vm−Vn)/K obtained by dividing (Vm−Vn) by the factor K is called a velocity term.

Upon subsequent turning on of the increase switch 11-3 to increase the set vehicle speed, the decision at step 103 turns to "Yes", and therefore step 108 is newly executed, so that the first flag $F_1$ is set to "1", followed by step 109 where the sum of the current vehicle speed Vn and the speed of 10 km/h is set to the set-speed register. Specifically, the set vehicle speed is changed from the value stored at the time of operation of the set switch 11-1 to the sum of the current vehicle speed Vn and 10 km/h. Then step 106 calculates the motor drive time T. Under this condition, since the set vehicle speed is changed to Vn+10 as mentioned above, the motor drive time T is given from the second equation:

$$T = \frac{10 - a(Vm - Vn)}{K}$$

After that, until the increase switch 11-3 is reversed from on to off state, the motor drive time T is determined from the second equation shown above.

As long as the increase switch 11-3 remains on, the motor drive time T is determined from an equation containing a certain velocity term such as euqivalent to 10 km/h, and therefore the opening of the throttle valve 1 is regulated always to attain a set vehicle speed higher than 10 km/h. As a result, even when the vehicle is running down or up a slope or has a different engine performance, extreme variations in the feeling of acceleration which otherwise might occur due to these differences is prevented, thus making it possible to attain a constant feeling of acceleration.

When the increase switch 11-3 is subsequently turned off upon increase of the current vehicle speed up to the desired set speed, the decision at step 103 reverses to "No", and the process is passed to step 104. Since the first flag $F_1$ is already set to "1" at the time of acceleration control as mentioned above, the decision at step 104 is "No", so that the new steps 110, 111 and 112 are sequentially executed. The first flag $F_1$ is thus set to "0" and the second flag $F_2$ to "1", and the current vehicle speed Vn is set in the set-speed register. Step 113 then decides whether or not the acceleration, that is (Vn−Vn−1) is more than a predetermined value such as 0.03 G. This step 113 corresponds to the comparator means according to the present invention. If the acceleration is less than 0.03 G, step 106 calculates the motor drive time T by the first equation as shown above. The set vehicle speed Vm in this equation is of course the current vehicle speed Vm updated at step 112. If the acceleration is 0.03 G or more, on the other hand, step 114 changes the factor K in the first equation from Ko to Ko/2, followed by step 106 for determining the motor drive time T by use of the value Ko/2. This step 114 corresponds to the factor setting means according to the present invention.

In this way, when the increase switch 11-3 is turned off, the current vehicle speed is changed to the set vehicle speed and the factor K is kept at Ko or changed to Ko/2 according to the magnitude of acceleration. This is in view of the fact that an overshoot is liable to occur in which the current vehicle speed is greatly displaced from the set vehicle speed if the acceleration is comparatively large in transfer from acceleration control to the constant-speed drive control, and therefore the control sensitivity is improved by changing the factor K to Ko/2 thereby to prevent the current vehicles speed from being greatly displaced from the set vehicle speed.

In the next process, the decision at step 104 is "Yes" since the first flag $F_1$ is set to "0", so that decision is made at step 105 whether the vehicle is running at constant speed or being accelerated. And since the vehicle is under acceleration due to the inertia of the vehicle or like, the motor drive time T is determined directly at the next step 106. The step 105 corresponds to the comparator means according to the present invention similar to the step 113. The motor drive time T is determined from the first equation containing the factor K (Ko or Ko/2) determined in accordance with the acceleration in transfer from acceleration control to the constant-speed drive control.

Subsequently when the vehicle transfers from acceleration through constant-speed drive to deceleration, the decision at step 105 becomes "No", followed by step 107 for deciding whether or not the second flag $F_2$ is "1". Under this condition, the second flag $F_2$ is already set to "1", and therefore the decision at step 107 is "Yes", so that step 115 changes the factor K to Ko. In other words, the value Ko/2 of the factor K is changed to original value Ko since the acceleration is 0.03 G or more in transfer from the acceleration control to the constant-speed drive control. Step 115, like step 114, corresponds to the factor setting means according to the present invention. Then, at step 116, the second flag $F_2$ is set to "0", followed by step 106 where the motor drive time T is determined from the first equation containing the value Ko of the factor K.

In the case where the vehicle transfers to deceleration after transfer from acceleration control to constant-speed drive control in this way, the factor K is changed to the original Ko so that the motor drive time T is calculated from the first equation containing Ko.

Subsequently, a process similar to the constant-speed drive control before execution of the acceleration control is executed, and the opening of the throttle valve 1 is regulated so that the current vehicle speed coincides with the increased set vehicle speed.

Figure 4:
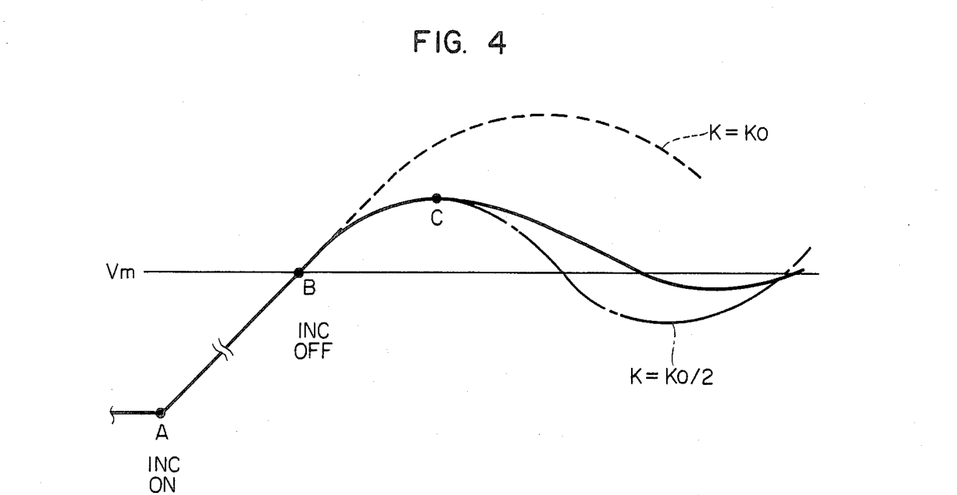
FIG. 4 is a diagram for explaining the operation of the control circuit.

FIG. 4 shows a general chronological change of the vehicle running speed that is caused by the process as shown in FIG. 3. In FIG. 4, point A designates a time point when the constant-speed control changes to acceleration control, point B a time point when acceleration control changes to a constant-speed drive control after speed increase, and point C a time point when the vehicle transfers to the deceleration condition after start of constant-speed drive control.

As shown in FIG. 4, when the vehicle transfers from constant-speed drive control to acceleration control at point A and further to constant-speed drive control at time point B and if the acceleration of the vehicle at time point B is not more than the predetermined value 0.03 G as mentioned above, then the motor drive time T is unable to take a value full catching up with the vehicle acceleration caused by inertia or like, the factor K being kept at Ko in the first equation. As a result, the running vehicle speed would be greatly displaced from the set vehicle speed Vm as shown by the dashed line in the same drawing. Nevertheless, according to the present embodiment, since the factor K is changed to Ko/2 as mentioned above, the motor drive time T has full responsiveness to the change in the running vehicle speed, so that the running vehicle speed, as shown by the solid line in the drawing, takes a value sufficiently near to the set vehicle speed Vm as compared with the running vehicle speed involved when the factor K is Ko. Upon detection of the vehicle deceleration at time point C, the running vehicle speed takes a curve as shown by solid line in the drawing of FIG. 3 as the factor K is changed to original value Ko. Therefore, such an undershoot as shown by one-dot chain in the drawing which is liable to occur if the motor drive time T is calculated with the factor K kept at Ko/2 is fully dampened, thereby preventing the running vehicle speed from being greatly reduced to the deceleration side from the set vehicle speed Vm.

Figure 5:
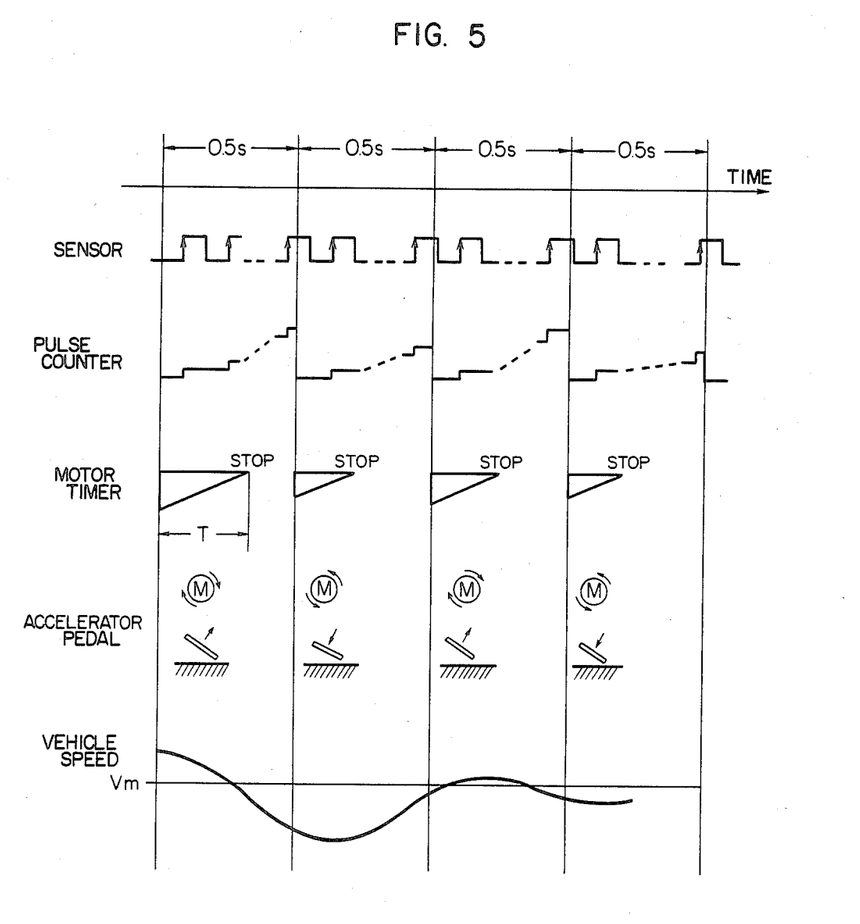
FIG. 5 is a diagram for explaining the operation of constant-speed drive control.

FIG. 5 shows a pulse signal from the vehicle speed sensor 10 under constant-speed drive control, a pulse counter for counting the pulse signal to obtain a vehicle speed, a motor timer to which the calculated motor drive time T is set, the direction of movement of the accelerator pedal, and the relation between the running vehicle speed and the set vehicle speed Vm, along the same time axis, with the motor drive time T calculated at intervals of 0.5 seconds.

As shown in this drawing, in the case where the vehicle running speed is higher than the set vehicle speed Vm, the motor 8 is driven in reverse direction for a corresponding time period so that the opening of the throttle valve 1 is reduced by an amount equivalent to the depression of the accelerator pedal thereby to reduce the vehicle running speed. In the case where the vehicle running speed is lower than the set vehicle speed Vm, by contrast, the motor 8 is driven in forward direction for a corresponding time length so that the opening of the throttle valve is increased to increase the vehicle running speed, thus controlling the running vehicle speed to coincide with the set vehicle speed Vm.

In the above-described embodiment, it is decided whether or not the vehicle acceleration is not less than a predetermined value such as 0.03 G at the time point of transfer from acceleration control to constant-speed drive control. This reference value is not necessarily fixed, but may take a value determined by a function of the vehicle speed which increases with the set vehicle speed.

Also, the velocity term which is given as (Vm−Vn)/K obtained by dividing the speed value (Vm−Vn) by the factor K as above may of course be replaced with equal effect by (Vm−Vn)/K multiplied by 1/K.

Further, the constant-speed drive attained after turning on the increase switch may alternatively be obtained by operation of the set switch while the vehicle is under acceleration with the accelerator pedal for a similar control to dampen the overshoot.

Figure 6:
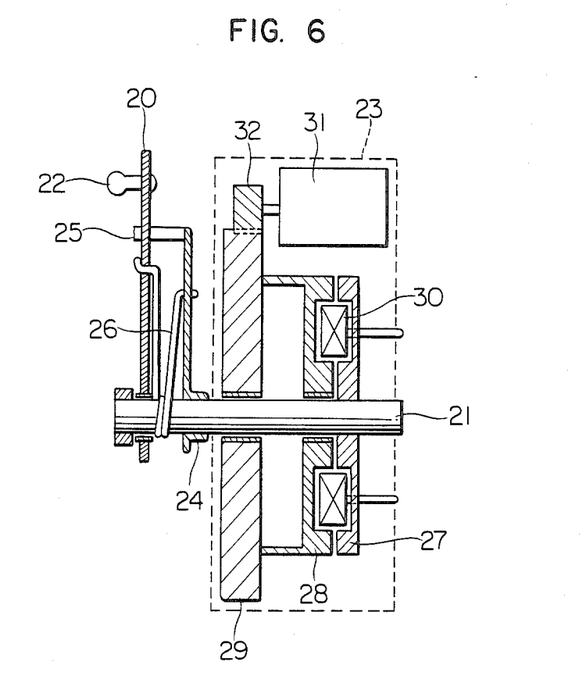
FIG. 6 is a diagram schematically showing a partial configuration of another embodiment of the present invention.

An explanation will now be provided of an embodiment which is suitable for eliminating the inconvenience which occurs when the set switch is operated after acceleration with accelerator pedal. FIG. 6 shows a case in which the actuator 4 includes a following mechanism in the control mechanism of FIG. 1. A lever 20 is rotatably mounted on a rotary shaft 21, and is coupled to a link mechanism between the throttle valve 1 and the accelerator pedal 6 by a coupling member 11. The shaft 21 is supported rotatably on an actuator housing 23, and a drive lever 24 is secured to a protrusion of the shaft 21 on lever 20 side thereof. The drive lever 24 is integrated with a pin 25, which is adapted to come into contact with the lever 20 to drive the lever 20 in the direction of acceleration when the shaft 21 rotates in the direction of acceleration. A spring 26 is arranged to urge the lever 20 into contact with the pin 25 between the drive lever 24 and the lever 20. Upon rotation of the shaft 21 in the direction of deceleration when the lever 20 is not subject to the force in the direction of acceleration by the accelerator pedal 6, therefore, the lever 20 is rotated in the direction of deceleration with the rotation of the shaft 21.

The shaft 21 is secured to a first clutch plate 27 in a housing 23. A second clutch plate 28 opposed to the first clutch plate 27 is rotatably supported on the shaft 21 together with a gear 29. The first and second clutch plates 27, 28 are provided with an excitation coil 30, the energization of which brings the plates 27 and 28 into contact with each other. A motor 31 arranged in the housing 23 and the turning effort thereof is transmitted through a small gear 32 to a gear 29.

When the system is not in operation, the clutches 27, 28, 30 are cut off. If the accelerator pedal 6 is depressed under this condition, the throttle valve 1 opens by the degree corresponding to the depression of the accelerator pedal, so that the drive lever 24 receives a turning effort through the spring 26 with the rotation of the lever 20 and rotates with the shaft 21 with the pin 25 in contact with the lever 20. When the depression of the accelerator pedal 6 is released, on the other hand, the throttle valve 1 begins to close, and the drive lever 25 receives a turning effort through the pin from the lever 20, thus rotating in the direction of deceleration with the shaft 21. In this way, the drive lever 24 is rotated in synchronism with the lever 20 with the pin 25 always in contact therewith.

Assume that the excitation coil 30 is supplied with power and the driver's foot is released from the accelerator pedal 6 to start a constant-speed drive. The turning effort of the motor 31 is transmitted through the gears 32, 29 and the clutch plates 28, 27 to the shaft 21, and further through the shaft 21, drive lever 24 and the spring 26 to the lever 20. In this system, the drive lever 24 is already in contact with the lever 20, and therefore the lever 20 is placed under the control of the electric motor 31 as soon as the clutches are connected. As a result, a vehicle running at an almost constant speed can transfer to a substantive constant-speed drive control.

If the set switch is turned on while in an abrupt accelerating operation by the operation of the accelerator pedal 6, the clutches which are coupled would prohibit free rotation of the drive lever 24, with the result that the lever 20 would be left as it is, immediately after the closure of the set switch, that is, with the throttle valve 1 considerably open.

Figure 7:
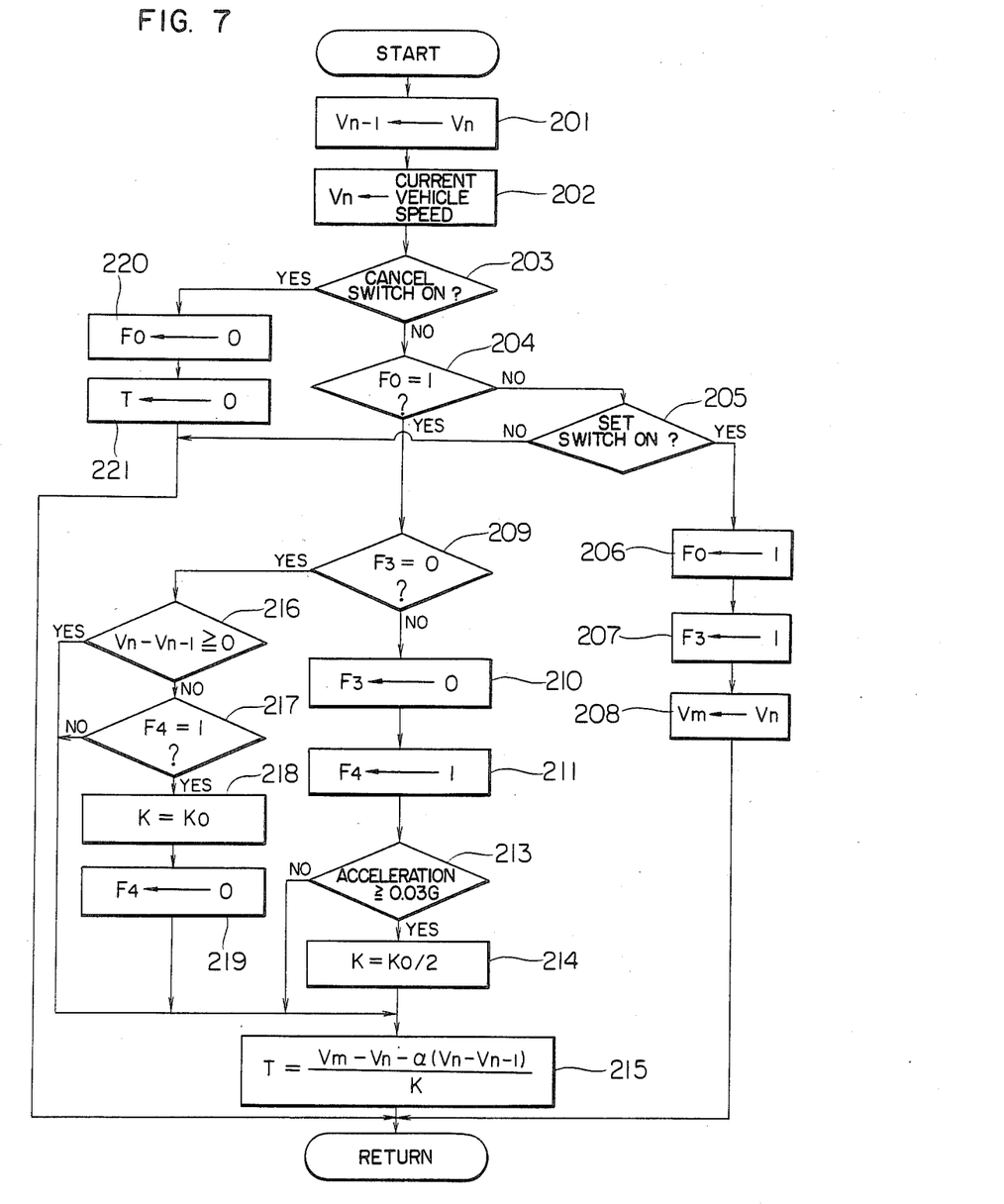
FIG. 7 is a flow chart for explaining the operation of another embodiment of the invention.

The system according to the present invention is intended to close the throttle valve 1 rapidly to position in such a situation. In order to achieve this object effectively, a control program with the essential parts shown in FIG. 7 is used with the system of FIG. 2. According to this control program, the control circuit 7 starts the execution of the shown operation by the turning on of the main switch 19. The difference of this embodiment from the corresponding part in FIG. 3 will be explained.

Flags $F_0$, $F_3$ and $F_4$ used in the control program are for storing predetermined conditions as in the previous description. The flag $F_0$, in particular, indicates whether a constant-speed drive is involved or not. At step 203 of the program, a decision is made as to whether the cancel switch 11-4 has been turned on, and when the decision at step 204 fails to indicate a constant-speed drive, the step 205 decides that the set switch 11-1 is to be turned on. Upon turning on of the set switch 11-1, the flags $F_0$ and $F_3$ are set and the set vehicle speed Vm is set to the current vehicle speed Vn by the processes at steps 206 to 208.

Once the set switch 11-1 is turned on, the flag $F_0$ is set, so that the processes of step 209 and subsequent steps are executed, thereby determining the value of the factor K for calculating of the motor drive time T in accordance with the vehicle acceleration as in the case described above. If step 213 decides that the vehicle acceleration has exceeded a predetermined value, the value of the factor K is changed to Ko/2, whereby the overshoot of the vehicle speed is prevented as mentioned earlier.

If the cancel switch 11-4 is turned on while the vehicle is running at constant speed, the flag $F_0$ is reset at the step 220 and the motor drive time T is reset to zero at the same time.

The embodiment described above represents a case where a motor is used as the actuator. This may be replaced with equal effect by an actuator of the vacuum type. In this case, however, both a control valve and a release valve are controlled, and the step for calculating the motor drive time T is replaced by a step for solving the following equation:

$$Dn = Dn - 1 + \frac{Vm - Vn - a(Vn - Vn - 1)}{K}$$

where Dn is a calculated duty value of the frequency signal applied to the control valve, and dn−1 a calculated duty value for the preceding case (such as 0.5 seconds before), Kn and Dn−1 being set initially to a predetermined value when the set switch is turned on.

It will be understood from the foregoing description that according to the present invention, in response to an instruction for constant-speed drive while the vehicle is under acceleration, it is decided whether the vehicle acceleration at that particular time is higher than a predetermined value, and in accordance with the result of this decision, the change rate of the opening of the throttle valve is determined by use of an equation in which the value of a factor is set accordingly. In the case where the acceleration is comparatively high, the value of the factor may be changed to improve the responsiveness of the change rate of the opening of the throttle valve with the change in vehicle speed, thus making it possible to fully prevent the overshoot of the running vehicle speed.

What is claimed is:

1. Apparatus for maintaining a running speed of a vehicle having an internal combustion engine, comprising:
   actuator means for regulating a throttle valve of the engine in response to an electrical signal applied thereto;
   vehicle speed sensor means for generating a vehicle speed signal indicative of an actual running speed of the vehicle;
   constant speed setting means responsive to said vehicle speed signal for setting a given constant speed of the vehicle in response to a constant running speed signal applied thereto;
   first storing means for storing the vehicle speed signal produced from said vehicle speed sensor means when said constant running speed signal is applied to said constant speed setting means;
   second storing means for storing the vehicle speed signal produced from said vehicle speed sensor means at predetermined periods of time from the time when said first storing means stores said vehicle speed signal;
   processing means for calculating an acceleration value for said vehicle from a difference between the vehicle speed stored in said first storing means and the vehicle speed stored in said second storing means; (b) calculating an actuator regulating value from a difference between said set constant speed and said actual running speed and the calculated acceleration value and producing the electrical signal applied to said actuator; (c) deciding whether the acceleration value of the vehicle is more than a predetermined value; and (d) correcting the regulating value of said actuator means to prevent the overshooting of said set constant speed of the vehicle, when the acceleration value of the vehicle exceeds said predetermined value.

2. Apparatus according to claim 1 wherein said processing means further performs the function (e) returning said regulating value to an original regulating value when said processing means determines that said vehicle is decelerating by comparing the vehicle acceleration value with an additional predetermined value after said regulating value has changed in response to a command for constant-speed drive.

3. A method for maintaining a running speed of a vehicle having an internal combustion engine, comprising the steps of:
   regulating, with an actuator, a throttle valve of the engine in response to an electrical signal applied thereto;
   generating a vehicle speed signal indicative of an actual running speed of the vehicle;
   setting, with a constant speed setting means, a given constant speed of the vehicle according to the vehicle speed signal when a constant running speed signal is applied to said constant speed setting means;
   storing, in first storing means, the vehicle speed signal when the constant running speed signal is applied to said constant speed setting means;
   storing, in a second storing means, the vehicle speed signal produced at predetermined periods of time from the time when the first storing means stores the vehicle speed signal;
   calculating an acceleration value for said vehicle from a difference between the vehicle speed stored in the first and second storing means;

calculating an actuator regulating value from a difference between the set constant speed and the calculated acceleration speed, and producing the electrical signal applied to the actuator;

deciding whether the acceleration value of the vehicle is more than a predetermined value; and correcting the regulating value of said actuator to prevent overshooting of the set constant speed of the vehicle, when the calculated acceleration value of the vehicle exceeds said predetermined value.

* * * * *